(12) United States Patent
Saito

(10) Patent No.: US 9,167,233 B2
(45) Date of Patent: Oct. 20, 2015

(54) NAKED-EYE STEREOSCOPIC DISPLAY APPARATUS

(71) Applicant: JVC KENWOOD CORPORATION, Yokohama-shi, Kanagawa (JP)

(72) Inventor: Atsushi Saito, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 253 days.

(21) Appl. No.: 13/920,300

(22) Filed: Jun. 18, 2013

(65) Prior Publication Data

US 2013/0278736 A1  Oct. 24, 2013

Related U.S. Application Data

(63) Continuation of application No. PCT/JP2012/062358, filed on May 15, 2012.

(30) Foreign Application Priority Data

May 27, 2011  (JP) .................................. 2011-118921

(51) Int. Cl.
*H04N 13/04* (2006.01)
*G09G 3/00* (2006.01)

(52) U.S. Cl.
CPC ........... *H04N 13/0404* (2013.01); *G09G 3/003* (2013.01); *H04N 13/0415* (2013.01); *H04N 13/0447* (2013.01); *G09G 2320/0233* (2013.01); *G09G 2320/0626* (2013.01)

(58) Field of Classification Search
CPC .................................................. H04N 13/0404

USPC ....................................................... 348/51, 59
See application file for complete search history.

(56) References Cited

U.S. PATENT DOCUMENTS

| 2005/0264651 | A1  | 12/2005 | Saishu et al. | |
|---|---|---|---|---|
| 2006/0050385 | A1* | 3/2006  | Uehara et al. | 359/465 |
| 2007/0188517 | A1* | 8/2007  | Takaki        | 345/613 |
| 2009/0079818 | A1* | 3/2009  | Saishu et al. | 348/51  |
| 2010/0265284 | A1* | 10/2010 | Satou et al.  | 345/697 |
| 2011/0285700 | A1* | 11/2011 | Kim et al.    | 345/419 |

FOREIGN PATENT DOCUMENTS

| JP | 3940456 A    | 9/1997  |
|----|--------------|---------|
| JP | 2001-056212 A| 2/2001  |
| JP | 2005-331844 A| 12/2005 |
| JP | 2006-106607 A| 4/2006  |
| JP | 2006-174258 A| 6/2006  |

(Continued)

*Primary Examiner* — Sath V Perungavoor
*Assistant Examiner* — Fabio Lima
(74) *Attorney, Agent, or Firm* — Nath, Goldberg & Meyer; Jerald L. Meyer; Stanley N. Protigal

(57) ABSTRACT

A plurality of pixels is arrayed on a display device. On the display device, a lenticular lens is arranged in a state where a periodic direction thereof is inclined with respect to a horizontal direction. The lenticular lens divides video data of N different viewpoints into separate viewpoint directions, presents the divided video data, and creates stereoscopic vision. In the event of assigning respective pieces of pixel data of video data composed of less than N viewpoint images to the plurality of pixels and displaying the pixel data, the drive unit lowers brightness of pixel data of viewpoint images seen to overlap each other.

9 Claims, 9 Drawing Sheets

(56) References Cited

FOREIGN PATENT DOCUMENTS

| JP | 2009-080144 A | 4/2009 |
| JP | 2009-251098 A | 10/2009 |
| JP | 2010-164852 A | 7/2010 |

* cited by examiner

FIG. 7

| VIEWPOINT | DISPLAY IMAGE | MODULATION INTENSITY |
|---|---|---|
| 0 | IMAGE A | 0.2 |
| 1 | IMAGE A | 0.5 |
| 2 | IMAGE A | 0.75 |
| 3 | IMAGE A | 1 |
| 4 | IMAGE A | 1 |
| 5 | IMAGE A | 1 |
| 6 | IMAGE A | 0.75 |
| 7 | IMAGE A | 0.5 |
| 8 | IMAGE A | 0.2 |
| 9 | IMAGE B | 0.2 |
| 10 | IMAGE B | 0.5 |
| 11 | IMAGE B | 0.75 |
| 12 | IMAGE B | 1 |
| 13 | IMAGE B | 1 |
| 14 | IMAGE B | 0.75 |
| 15 | IMAGE B | 0.5 |
| 16 | IMAGE B | 0.2 |

| VIEWPOINT | n≠2 | n=2 |
|---|---|---|
| 0 | 1 | 0.2 |
| 1 | 1 | 0.5 |
| 2 | 1 | 0.75 |
| 3 | 1 | 1 |
| 4 | 1 | 1 |
| 5 | 1 | 1 |
| 6 | 1 | 0.75 |
| 7 | 1 | 0.5 |
| 8 | 1 | 0.2 |
| 9 | 1 | 0.2 |
| 10 | 1 | 0.5 |
| 11 | 1 | 0.75 |
| 12 | 1 | 1 |
| 13 | 1 | 1 |
| 14 | 1 | 0.75 |
| 15 | 1 | 0.5 |
| 16 | 1 | 0.2 |

FIG. 12

| VIEWPOINT | NUMBER n OF VIEWPOINTS, DETECTED BY NUMBER-OF-VIEWPOINTS DETECTION UNIT 13 | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 1 |
| 2 | 0 | 0 | 0 | 0 | 0 | 0 | 0 | 0 | 1 | 1 | 1 | 1 | 1 | 1 | 1 | 1 | 2 |
| 3 | 0 | 0 | 0 | 0 | 0 | 1 | 1 | 1 | 1 | 1 | 2 | 2 | 2 | 2 | 2 | 2 | 3 |
| 4 | 0 | 0 | 0 | 0 | 1 | 1 | 1 | 1 | 2 | 2 | 2 | 3 | 3 | 3 | 3 | 3 | 3 |
| 5 | 0 | 0 | 0 | 1 | 1 | 1 | 2 | 2 | 2 | 3 | 3 | 3 | 4 | 4 | 4 | 4 | 5 |
| 6 | 0 | 0 | 1 | 1 | 1 | 2 | 2 | 2 | 3 | 3 | 4 | 4 | 4 | 5 | 5 | 5 | 6 |
| 7 | 0 | 0 | 1 | 1 | 2 | 2 | 2 | 3 | 3 | 4 | 4 | 4 | 5 | 6 | 6 | 6 | 7 |
| 8 | 0 | 0 | 1 | 1 | 2 | 2 | 3 | 3 | 4 | 5 | 5 | 5 | 6 | 6 | 7 | 7 | 8 |
| 9 | 0 | 1 | 1 | 2 | 2 | 3 | 3 | 4 | 5 | 5 | 6 | 6 | 7 | 7 | 8 | 8 | 9 |
| 10 | 0 | 1 | 1 | 2 | 3 | 3 | 4 | 4 | 5 | 6 | 6 | 7 | 8 | 8 | 9 | 9 | 10 |
| 11 | 0 | 1 | 2 | 2 | 3 | 4 | 4 | 5 | 6 | 6 | 7 | 7 | 8 | 9 | 10 | 10 | 11 |
| 12 | 0 | 1 | 2 | 2 | 3 | 4 | 5 | 5 | 6 | 7 | 8 | 8 | 9 | 10 | 11 | 11 | 12 |
| 13 | 0 | 1 | 2 | 3 | 4 | 4 | 5 | 6 | 7 | 8 | 8 | 9 | 10 | 11 | 12 | 12 | 13 |
| 14 | 0 | 1 | 2 | 3 | 4 | 5 | 6 | 6 | 7 | 8 | 9 | 10 | 11 | 12 | 13 | 13 | 14 |
| 15 | 0 | 1 | 2 | 3 | 4 | 5 | 6 | 7 | 8 | 9 | 10 | 11 | 12 | 13 | 14 | 14 | 15 |
| 16 | 0 | 1 | 2 | 3 | 4 | 5 | 6 | 7 | 8 | 9 | 10 | 11 | 12 | 13 | 14 | 15 | 16 |

NAKED-EYE STEREOSCOPIC DISPLAY APPARATUS

CROSS REFERENCE TO RELATED APPLICATION

This application is a Continuation of PCT Application No. PCT/JP2012/062358, filed on May 15, 2012, and claims the priority of Japanese Patent Application No. 2011-118921, filed on May 27, 2011, the entire contents of both of which are incorporated herein by reference.

BACKGROUND

An embodiment relates to a naked-eye stereoscopic display apparatus having a parallax in a single dimension.

There are known technologies in which an image displayed on a display device such as a printing surface and a liquid crystal panel is divided into a plurality of viewpoint directions and presented by using a special optical member such as a lenticular lens, a slit-like barrier or a lens array. Thereby, the displayed image changes according to the position of the viewer.

As an example of one such technology, there is a technology for allowing the display image to be stereoscopically viewed in such a manner that different display images (parallax images) of the same object, which have a specific parallax therebetween, are inputted to the right eye and left eye of a person who views the display device. In accordance with this stereoscopic technology, a naked-eye stereoscopic display apparatus can be realized which enables the person to achieve stereoscopic vision without the need to wear special eyeglasses.

In the case of achieving stereoscopic vision of the image in the naked-eye stereoscopic display apparatus, there is a requirement that the number of viewpoints be increased by dividing the display image as finely as possible. This is in order to expand the visual recognition range in which stereoscopic vision can be achieved, and to obtain natural stereoscopic vision and smooth motion parallax, which are worthy of long-time viewing. Recently, in a relatively low-resolution display device such as digital signage or a car navigation device, stereoscopic vision using parallax images has been performed for the purpose of enhancing visual attraction and visibility regarding stereoscopic information. However, as the number of viewpoints is increased, the resolution feeling is lowered. Note that it is defined that a value physically owned by the display device itself is the resolution, and that the extent of the resolution sensed by a person is the resolution feeling. Even in the case of achieving stereoscopic vision of the display image on the low-resolution display device, there is a requirement that natural stereoscopic vision be realized by suppressing the lowering of the resolution as much as possible.

In order to satisfy these requirements a multi-eye type is effective, in which the viewpoints are not divided by assuming positions of eyes of an observer who observes the display device, but instead viewpoints are divided as finely as possible, and the observer views the display device at any viewpoint among the finely divided viewpoints. In order to increase the number of parallax images, it is effective to increase the lens pitch with respect to the pixel pitch of the display device, for example, in the case where the optical member to be mounted on the display device is a lenticular lens. However, owing to the magnification effect of the lens, as the lens pitch increases color pixels look larger, and accordingly, the resolution feeling of the parallax images in the pitch direction of the lens is significantly lowered. Then, a malfunction occurs in that the resolution feeling of the parallax images differs between the horizontal direction and the vertical direction. Note that the same shall also apply to the case of using an optical member such as a barrier.

As a technology for solving this malfunction, as described in Japanese Patent No. 390456 (Patent Literature 1), it is described that the periodic direction of cylindrical lenses (optical elements) which compose the lenticular lens (optical member) is inclined with respect to the horizontal direction of the pixel array of the display device. In accordance with the technology described in Patent Literature 1, one three-dimensional image is composed by using not only the pixels in the horizontal direction but also the pixels in the vertical direction, whereby the lowering of the resolution feeling in the horizontal direction in the stereoscopic display can be suppressed, and the balance of the resolution feeling between the horizontal and vertical directions can be enhanced.

SUMMARY

In order to create multi-viewpoint video contents ready for a multi-viewpoint naked-eye stereoscopic display apparatus, it is necessary to image a subject using a plurality of cameras equal to the number of viewpoints, or to perform multi-viewpoint rendering of the viewpoints by computer graphics. In the former case, one camera is required for each viewpoint and so the cost of the imaging rises, and accordingly, the cost of the multi-viewpoint video contents increases. In the latter case, computational complexity of the rendering increases, and accordingly, the cost of the multi-viewpoint video contents becomes high.

Meanwhile, cost of two-viewpoint video contents is low, and easily available owing to popularization of stereoscopic movies watched by wearing eyeglasses to achieve stereoscopic vision. Accordingly, it is conceived to display the two-viewpoint video contents (stereo contents) on a naked-eye stereoscopic display apparatus supporting three or more viewpoints. However, if the stereo contents are displayed on a naked-eye stereoscopic display apparatus supporting three or more viewpoints, then when the naked-eye stereoscopic display apparatus is seen from a certain position, both viewpoint images are visible and are seen to overlap in the horizontal direction. Therefore, in the case where the parallax between the images of the two viewpoints is large, the images become largely blurred left to right, and the resolution feeling in the horizontal direction is deteriorated. Moreover, noise is generated in the area where the images overlap in the horizontal direction, and this gives a tired feeling to the observer.

It is an object of the embodiment to provide a naked-eye stereoscopic display apparatus capable of suppressing the deterioration of the resolution feeling and the generation of noise in the event of displaying video data with less than N viewpoints (where N is an integer of three or more) on a naked-eye stereoscopic display apparatus that supports naked-eye stereoscopic vision with N viewpoints by using an optical member in which the periodic direction of the optical elements is inclined with respect to the horizontal direction of the pixel array.

In order to solve the conventional technical problems mentioned above, an aspect of the embodiment provides a naked-eye stereoscopic display apparatus comprising: a display device in which a plurality of pixels are arrayed in a horizontal direction and a vertical direction; an optical member in which a plurality of optical elements are periodically arrayed and arranged on the display device in a state where the periodic direction of the optical elements is inclined with respect to the horizontal direction of the pixels in the display device and whereby, in the event of displaying first image data composed of N different viewpoint images where N is defined as an integer of three or more, the optical member is configured to divide the viewpoint images into each separate viewpoint direction and to present the divided viewpoint images on the display device, by assigning respective pieces of pixel data of the first image data to the plurality of pixels; and a brightness control unit which, in a state where second video data composed of less than N different viewpoint images is displayed on the display device by assigning respective pieces of pixel data of the second video data to the plurality of pixels, and where an observer observes the display device from the optical member side, is configured to lower brightness of pixel data of viewpoint images which are seen to overlap each other.

BRIEF DESCRIPTION OF THE DRAWINGS

FIG. 7 is a view showing an example of an intensity modulation setting table for use in this embodiment.

FIG. 12 is a view showing an example of a viewpoint assignment table for use in the second configuration example.

DETAILED DESCRIPTION

A description is made below of a naked-eye stereoscopic display apparatus of an embodiment with reference to the accompanying drawings.

Figure 1A:
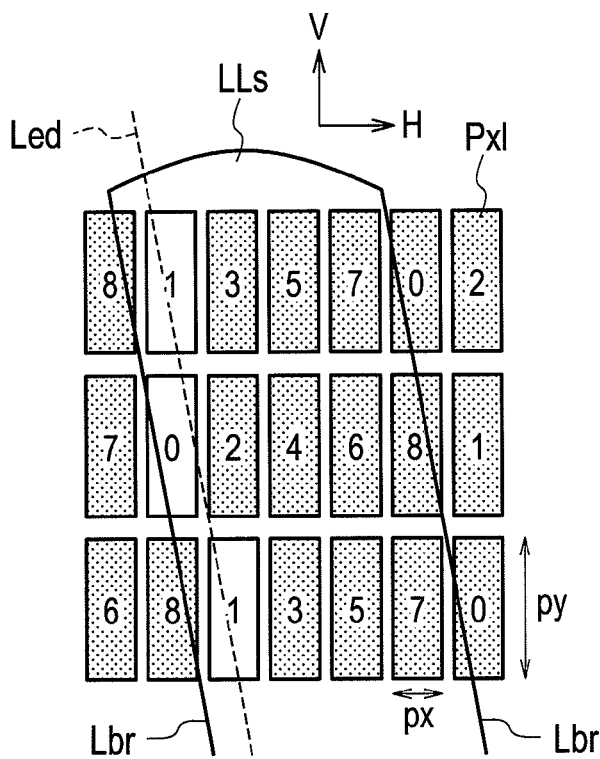
FIG. 1A is a view showing a configuration example of a naked-eye stereoscopic display apparatus capable of displaying a video with nine viewpoints.
Figure 1B:
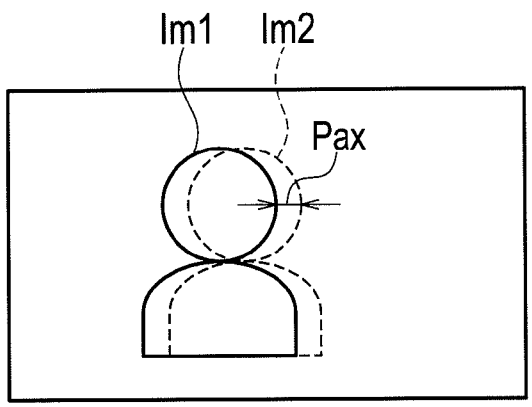
FIG. 1B is a view showing that images are seen to overlap each other when the naked-eye stereoscopic display apparatus of FIG. 1A is viewed from a certain position.

First, by using FIG. 1A and FIG. 1B, a description follows of reasons why an image is visually recognized so as to be seen to overlap in a multi-eye type naked-eye stereoscopic display apparatus.

FIG. 1A is a configuration example of a naked-eye stereoscopic display apparatus capable of displaying a video with nine viewpoints, which are viewpoints 0 to 8. In FIG. 1A, on a display device 50, a plurality of pixels Pxl are arrayed in horizontal (H) and vertical (V) directions. Numerals added to the pixels Pxl denote which viewpoint image each of the pixels Pxl displays. Here, only one cylindrical lens is shown; however in reality, on the plurality of arrayed pixels Pxl, a lenticular lens LLs is arranged in a state where the periodic direction of the cylindrical lenses is inclined with respect to the horizontal direction of the array of the pixels Pxl. The periodic direction of the cylindrical lenses (lenticular lens LLs) is a direction perpendicular to boundary lines Lbr between the cylindrical lenses.

In the case of assuming that there are no black stripes, the pixel pitch in the horizontal direction of the pixels Pxl is px, and the pixel pitch in the vertical direction thereof is py. The lens pitch in the horizontal direction of the lenticular lens LLs becomes 4.5 px, and the inclination angle thereof becomes $\tan^{-1}(px/2py)$.

In the case where the naked-eye stereoscopic display apparatus (display device 50) of FIG. 1A is viewed from a certain position, only the pixels Pxl present on a straight line Led, which is shown by a broken line at an equal distance from each of the boundary lines Lbr of the cylindrical lenses, are seen. The pixels Pxl seen on the straight line Led are shown in white, and other pixels Pxl are shown with a texture pattern. As understood from FIG. 1A, an image of the viewpoint 0 and an image of the viewpoint 1 are seen. Therefore, as shown in FIG. 1B, the created viewpoint images Im1 and Im2 are visually recognized as overlapping each other. A parallax Pax is present between the viewpoint image Im1 and the viewpoint image Im2. In the case where the parallax Pax is large, an image which is largely blurred left to right is formed, and the resolution feeling in the horizontal direction deteriorates.

Next follows a description of the case of displaying two-viewpoint stereo contents on an N-viewpoint (N is an integer of 3 or more) naked-eye stereoscopic display apparatus. It is defined that the image to be displayed by one video signal in the two-viewpoint stereo contents is image A, and that the image to be displayed by the other video signal is image B. Using reference numerals 0 to N−1 to define each of the N-viewpoints, it is conceived that if N is an even number, then the N viewpoints are divided into two and image A is assigned and displayed using viewpoints 0 to (N/2)−1 and image B is assigned and displayed using viewpoints N/2 to N−1. If N is an odd number, it is conceived that image A is assigned and displayed using viewpoints 0 to ((N−1)/2)−1 and image B is assigned and displayed using viewpoints ((N−1)/2)+1 to N−1. Either of image A or image B is assigned and displayed on the center viewpoint (N−1)/2.

Figure 2:
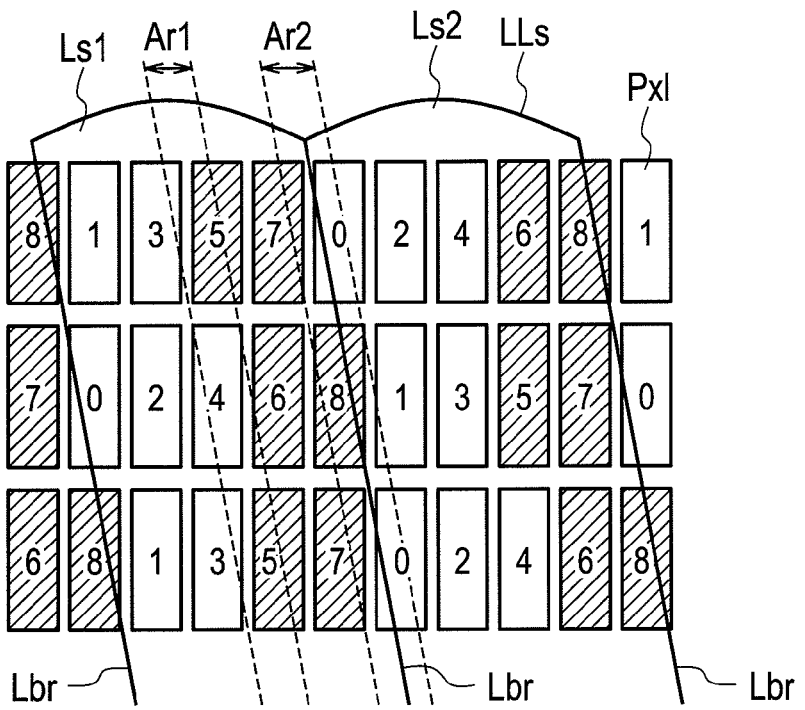
FIG. 2 is a view showing an example of assigning viewpoint images in the case of displaying stereo contents with two viewpoints on the naked-eye stereoscopic display apparatus with nine viewpoints.

FIG. 2 shows the case of displaying the images A and B in the two-viewpoint stereo contents on such a nine-viewpoint naked-eye stereoscopic display apparatus. In the example of FIG. 2, the image A is assigned to the viewpoints 0 to 4, and the image B is assigned to the viewpoints 5 to 8. The image A is displayed on the pixels Pxl shown in white, and the image B is displayed on the hatched pixels Pxl. Here, two cylindrical lenses Ls1 and Ls2 in the lenticular lens LLs are shown. Even if the lenticular lens LLs is an ideal lens, when the pixels Pxl in regions Ar1 and Ar2 are seen, the image A and the image B are always visually recognized as overlapping each other. As described with reference to FIG. 1B, the parallax Pax is present, and the resolution feeling in the horizontal direction will be deteriorated.

In particular, in the naked-eye stereoscopic display apparatus using the lenticular lens LLs as an optical member, color pixels magnified by the lenses are visually recognized to be bright. Accordingly, when the two overlapping viewpoint images are visually recognized, the viewpoint images concerned look like noise in the region where the pixel value is different between image A and image B, and the observer is prone to be given a tired feeling. In the case of displaying the two-viewpoint stereo contents on the N-viewpoint naked-eye stereoscopic display apparatus, it is frequent that the parallax Pax between the viewpoint image Im1 and the viewpoint image Im2 is large, and the region to be visually recognized as noise is wide. Accordingly, the observer is particularly prone to be given the tired feeling.

Figure 3:
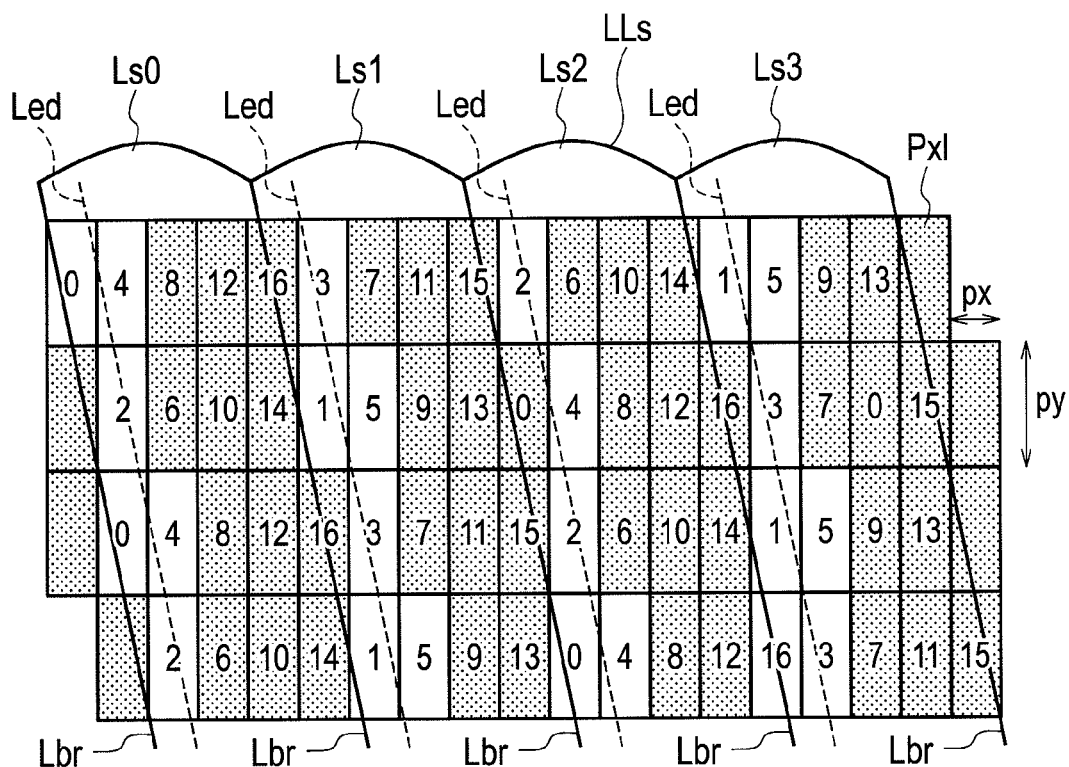
FIG. 3 is a view showing a naked-eye stereoscopic display apparatus capable of displaying an image with 17 viewpoints.

FIG. 3 shows a naked-eye stereoscopic display apparatus capable of displaying an image with 17 viewpoints. Numerals added to the pixels Pxl denote which viewpoint image from viewpoint 0 to viewpoint 16 each of the pixels Pxl displays. Here, four cylindrical lenses Ls0 to Ls3 in the lenticular lens LLs are shown. The lens pitch in the horizontal direction of the lenticular lens LLs is 4.25 px, and the inclination angle thereof is $\tan^{-1}$ (px/2py). Note that under these conditions, the maximum number of displayable viewpoints is 17.

In the case where the observer observes the naked-eye stereoscopic display apparatus of FIG. 3 at a predetermined position, the observer will visually recognize only the pixels Pxl present on the straight lines Led, which are shown by broken lines at an equal distance from the boundary lines Lbr of the lenticular lens LLs. The observed pixels Pxl will be magnified by the pitch width of the lenticular lens LLs.

With respect to the pixels Pxl on the straight lines Led in the cylindrical lenses Ls0 and Ls2, the viewpoint images 0, 2 and 4 are seen with viewpoint image 2 at the center. With respect to the pixels Pxl on the straight lines Led in the cylindrical lenses Ls1 and Ls3, the viewpoint images 1, 3 and 5 are seen with viewpoint image 3 at the center. In the viewpoint images 0, 2 and 4, viewpoint image 2 has highest brightness, in the viewpoint images 1, 3 and 5, viewpoint image 3 has highest brightness, and accordingly, viewpoint images 2 and 3 become the centers of the viewpoints.

That is to say, the observer who sees the pixels Pxl on the straight lines Led will visually recognize images of six viewpoints, which are the viewpoint images 0 to 5, in a state where the images concerned are seen as overlapping each other with viewpoint images 2 and 3 taken as the centers. The number of overlapping viewpoints seen when the naked-eye stereoscopic display apparatus is viewed from the predetermined position, is expressed as the number of duplicate viewpoints.

Figure 4:
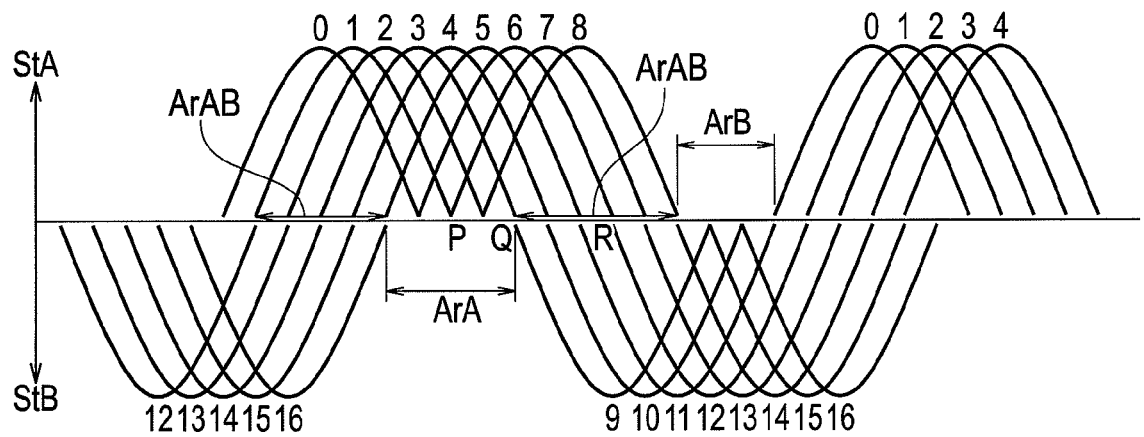
FIG. 4 is a diagram conceptually showing brightness intensities at the respective viewpoints in the case of displaying the stereo contents on the naked-eye stereoscopic display apparatus shown in FIG. 3.

FIG. 4 conceptually shows brightness intensities at the respective viewpoints in the case of displaying image A on the viewpoints 0 to 8 of the naked-eye stereoscopic display apparatus shown in FIG. 3 and displaying image B on the viewpoints 9 to 16 therein. In FIG. 4, the horizontal direction indicates the horizontal direction of the observer, the upper vertical direction indicates the brightness intensities StA of the image A, and the lower vertical direction indicates the brightness intensities StB of the image B. Numerals added adjacent to characteristics of intensity distributions are numbers of the viewpoint images.

In FIG. 4, region ArA is the region where only image A is visually recognized, and region Arb is the region where only image B is visually recognized. Each of regions ArAB is a region where both of the images A and B are visually recognized. When the observation point is moved to the right from an observation point P at which the image of the viewpoint 4 in image A is seen, the image of the viewpoint 9 in image B starts to be observed from an observation point Q, and the intensity of image A and the intensity of image B become equal to each other at an observation point R. In a configuration using the lenticular lens LLs, when the observation point is moved from the observation point Q to the observation point R, the brightness of image B becomes suddenly intense, and accordingly, the related viewpoint images are prone to be recognized as noise, and are prone to give the tired feeling.

Figure 5:
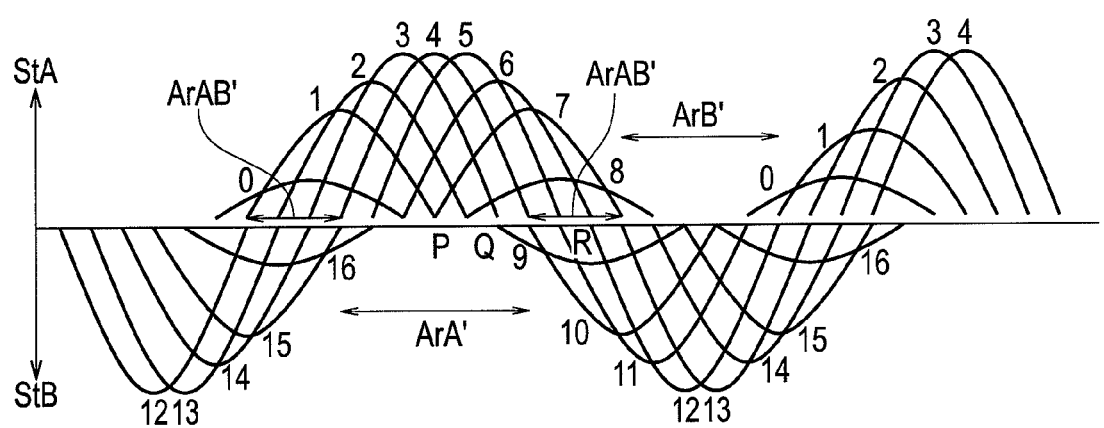
FIG. 5 is a diagram conceptually showing brightness intensities at the respective viewpoints in the case of displaying the stereo contents on a naked-eye stereoscopic display apparatus of this embodiment.
Figure 6:
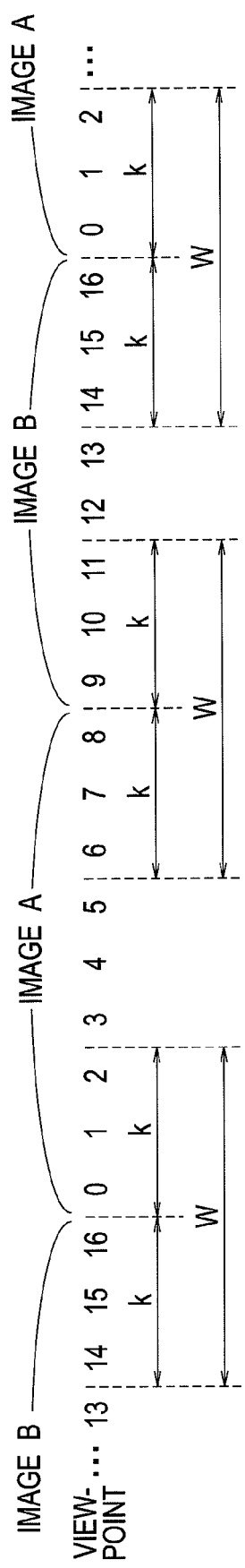
FIG. 6 is a diagram conceptually showing the range where brightness is modulated in this embodiment.

Accordingly, in this embodiment, the brightness of each of the images A and B is modulated as shown in FIG. 5. FIG. 6 conceptually shows viewpoint ranges where the brightness is modulated. As mentioned above, in the naked-eye stereoscopic display apparatus with 17 viewpoints numbered viewpoints 0 to 16, the number of duplicate viewpoints is six points. In FIG. 6, the ranges of the duplicate viewpoints are shown by duplicate viewpoint ranges W. The duplicate viewpoint ranges W are a range of k (where k is a natural number) from image A and a range of k from image B. W is equal to 2 k. The number of duplicate viewpoints is the number of viewpoints in the range 2 k.

In this embodiment, the brightness of each of the images A and B is modulated in the range of at least the duplicate viewpoint ranges W. The brightness of each of the images A and B may be modulated in a range wider than the duplicate viewpoint ranges W. FIG. 7 is an example of an intensity modulation setting table showing the modulation intensities of images A and B at the respective viewpoints. FIG. 5 shows the intensities StA and StB in the case of modulating the brightness by the modulation intensities shown in FIG. 7.

In this embodiment, the brightness is modulated in both ranges of k (image A side and image B side) within a range 0 to 1 of the modulation intensity centered on the boundaries between the images. Specifically, in the event where the observer moves the observation point of the naked-eye stereoscopic display apparatus in the horizontal direction, brightness of pixel data of the viewpoint images in the range k in the horizontal direction approaching the image boundary and brightness of pixel data of the viewpoint images in the range k in the horizontal direction moving away from the image boundary, are lowered.

Hence, as shown in FIG. 5, a region ArA' where only image A is visually recognized and a region ArB' where only image B is visually recognized become wider than the regions ArA and ArB of FIG. 4. Meanwhile, each of regions ArAB' where both of the images A and B are visually recognized become narrower than each region ArAB of FIG. 4. When the observation point is moved to the right from the observation point P at which the image of viewpoint 4 in image A is seen, even if the observation point passes through the observation point Q, the image of viewpoint 9 is not immediately recognized since the intensity StB is small. Even if the observation point is moved from the observation point Q to the observation point R, the brightness of image B does not become suddenly intense, but gently increases, and accordingly, the related viewpoint images are less likely to be recognized as noise, and are less likely to give the tired feeling. Since the related viewpoint images are less likely to be recognized as noise, the deterioration of the resolution feeling can also be suppressed.

The modulation intensities of images A and B shown in FIG. 7 are merely examples, and the way of modulating the brightness of each of the images A and B is not limited to that shown in FIG. 7. For example, the modulation intensities of viewpoints 0, 8, 9 and 16 may be set at 0. An example shown in FIG. 7 and an example where the modulation intensities of viewpoints 0, 8, 9 and 16 are set at 0, are those in which the modulation intensities are made non-linear. The modulation intensities of viewpoints 0, 8, 9 and 16 may be set at 0.25, and the modulation intensities may be thereby made linear.

In this embodiment, a higher effect is obtained as the brightness is lowered and the modulation intensities are reduced at the boundaries where the viewpoint images are switched (around viewpoints 0, 8, 9 and 16). Therefore, in order to maintain brightness during the modulation process such a non-linear modulation process is preferable, in which the brightness is lowered for the viewpoint images nearer the viewpoints 0, 8, 9 and 16, and but unaffected at the central viewpoints of both images.

Therefore, in order to ensure the brightness while keeping on maintaining the effect, preferably, such non-linear modulation is performed, in which the brightness is lowered on the viewpoint images nearer the viewpoints 0, 8, 9 and 16, and a lowering degree of the brightness is reduced as being separated therefrom. Next, a description is made of specific configuration examples of the naked-eye stereoscopic display apparatus that realizes the brightness modulation shown in FIG. 5.

First Configuration Example

Figure 8:
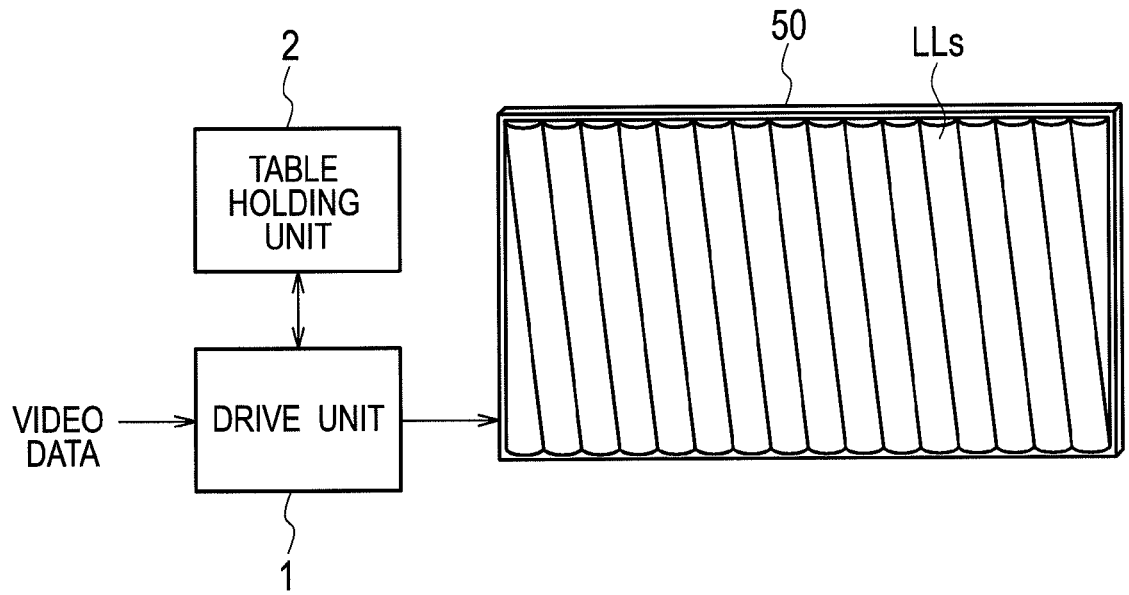
FIG. 8 is a block diagram showing a first configuration example in the naked-eye stereoscopic display apparatus of this embodiment.
Figure 9:
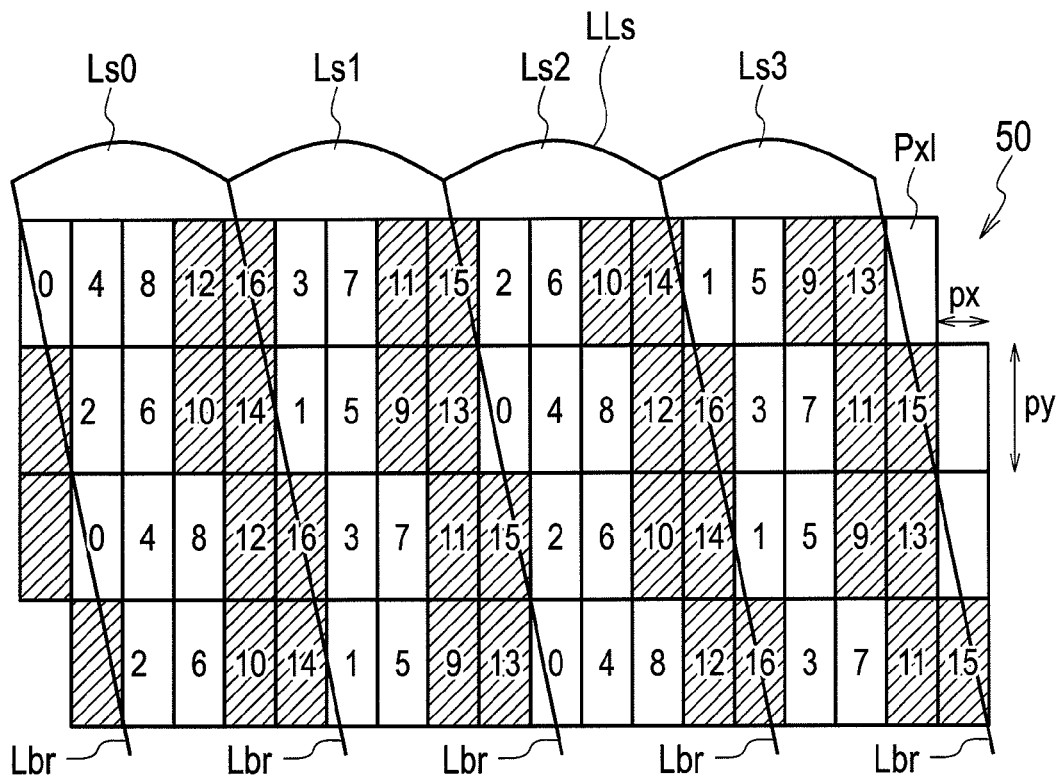
FIG. 9 is a view showing a specific configuration example of a display device 50 and a lenticular lens LLs in FIG. 8.

FIG. 8 is a first configuration example of the naked-eye stereoscopic display apparatus. The first configuration example is a configuration example suitable for the case where it is predetermined that video data to be inputted is two-viewpoint stereo contents. In the example shown in FIG. 8, the lenticular lens LLs is used as the optical member, mounted on the surface of the liquid crystal panel display device 50. The observer observes the display device 50 from the lenticular lens LLs side. As shown in FIG. 9, the lenticular lens LLs is a lens in which the plurality of cylindrical lens Ls0, Ls1, Ls2 . . . are coupled to one another. Between the adjacent cylindrical lenses, the boundary lines Lbr are defined.

In the example shown in FIG. 9 the display device 50 is of a type capable of displaying an image with 17 viewpoints in a similar way to FIG. 3. FIG. 9 shows which viewpoint image among the viewpoints 0 to 16 is to be displayed on each of the pixels Pxl. The pixel pitch in the horizontal direction of the pixels Pxl is px, and the pixel pitch in the vertical direction thereof is py, the lens pitch in the horizontal direction of the lenticular lens LLs is 4.25 px, and the inclination angle thereof is $\tan^{-1}$ (px/2py). Note that the pixels Pxl here are color pixels. In this example, the parallax video is divided one-dimensionally, mainly in the horizontal direction.

In FIG. 8, video data as stereo contents is inputted to a drive unit 1. The format of the video data is arbitrary, and may be any of a line-by-line method, a side-by-side method, a frame sequential method and the like. As shown in FIG. 9, an image A in the video data to be inputted is assigned to and displayed on the pixels Pxl shown in white, and an image B therein is assigned to and displayed on the hatched pixels Pxl. The drive unit 1 drives the display device 50 to display the respective pixel data of individual data portions, which compose the image A and the image B in the inputted video data, while assigning the respective pixel data to the respective pixels of the 17-view point display device 50 as shown in FIG. 9.

In FIG. 8, in a table holding unit 2, the intensity modulation setting table shown in FIG. 7 is held. Based on the intensity modulation setting table held in the table holding unit 2, the drive unit 1 modulates the brightness of the pixel data to be displayed on each pixel Pxl of the display device 50, and displays the image data concerned on the display device 50. In place of holding the intensity modulation setting table in the table holding unit 2, a function for modulating the intensity may be held in advance, and the brightness of the pixel data may be modulated by calculation using the function.

In the first configuration example, the drive unit 1 itself that drives the display unit 50 to display the stereo contents, serves as a brightness control unit that functions to lower the brightness of the pixel data of the viewpoint images which are seen to overlap each other.

Second Configuration Example

Figures 10, 11:
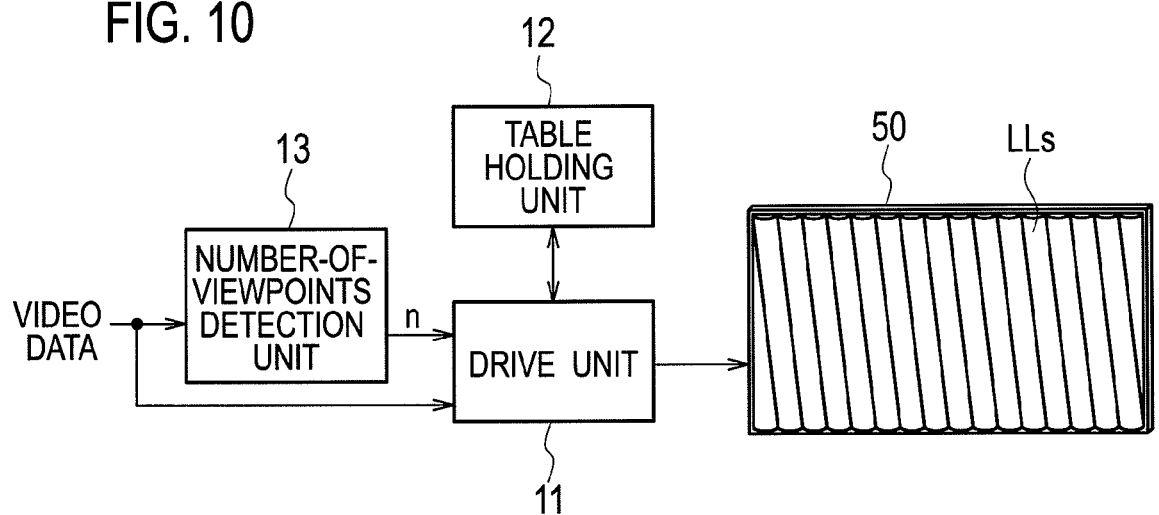
FIG. 10 is a block diagram showing a second configuration example in the naked-eye stereoscopic display apparatus of this embodiment.
FIG. 11 is a view showing an example of an intensity modulation setting table for use in the second configuration example.

A second configuration example shown in FIG. 10 is a configuration example suitable for the case where the video data to be inputted is not limited to two-viewpoint stereo contents. In FIG. 10, the same reference numerals are added to the same portions as in FIG. 8, and a description thereof is omitted as appropriate.

In FIG. 10, video data is inputted to a number-of-viewpoints detection unit 13 and a drive unit 11. If the display device 50 is capable of displaying N-viewpoint images, then the video data to be inputted is video data composed of less than N viewpoint images. In a similar way to the first configuration example, in the case of the 17-viewpoint display device 50, the video data to be inputted has 16 or less viewpoints. As an example, the video data includes information indicating the number of viewpoints in header information. The number-of-viewpoints detection unit 13 detects the number n of viewpoints based on the header information of the inputted video data. Data indicating the number of viewpoints n is inputted to the drive unit 11.

In the table holding unit 12, an intensity modulation setting table shown in FIG. 11 is held. The second configuration example is configured so as to modulate the brightness only in the case of displaying two-viewpoint stereo content video data on the 17-viewpoint display device 50, as described with reference to FIG. 5. No configuration is provided for brightness modulation in the case of video data of a different number of viewpoints. As shown in FIG. 11, for the viewpoints 0 to 16, "1" is set to indicate that the brightness is not modulated in the case where the number n of viewpoints is other than two, and in the case where the number n of viewpoints is two, modulation intensities values less than 1 are set in a similar way to FIG. 7.

In the case of having determined from the input data that the inputted video data is two-viewpoint stereo contents, the drive unit 11 modulates the brightness of the pixel data which is to be displayed on each pixel Pxl of the display device 50, based on the intensity modulation setting table held in the table holding unit 12, and then displays the image data concerned on the display device 50. Moreover, in the case of having determined from the input data that the number n of viewpoints of the inputted video data is other than two, then based on the intensity modulation setting table held in the table holding unit 12, the drive unit 11 displays the image data on each pixel Pxl of the display device 50, without modulating the brightness thereof.

FIG. 12 shows how to assign each of the n viewpoints, as detected by the number-of-viewpoints detection unit 13, to the viewpoints 0 to 16 in the case of a maximum of 17 viewpoints. In the column in which the number n of viewpoints as detected by the number-of-viewpoints detection unit 13, is two, "0" indicates that the above-mentioned image A is to be assigned, and "1" indicates that the above-mentioned B is to be assigned. The table holding unit 12 also holds the viewpoint assignment table shown in FIG. 12.

In the case where the number n of viewpoints of the inputted video data is other than two, then based on the viewpoint assignment table of FIG. 12, the drive unit 11 assigns the viewpoints accordingly, and displays the video data on the display device 50. Note that, in the second configuration example, the number of displayable viewpoints is 17, and accordingly, in the case where the number n of viewpoints as detected by the number-of-viewpoints detection unit 13, exceeds 17, a processing error may be raised.

Also in the second configuration example, the drive unit itself that drives the display unit 50 serves as the brightness control unit that performs the control to lower the brightness of the pixel data of the viewpoint images which are seen to overlap each other in the case of displaying the two-viewpoint video contents.

Third Configuration Example

Figure 13:
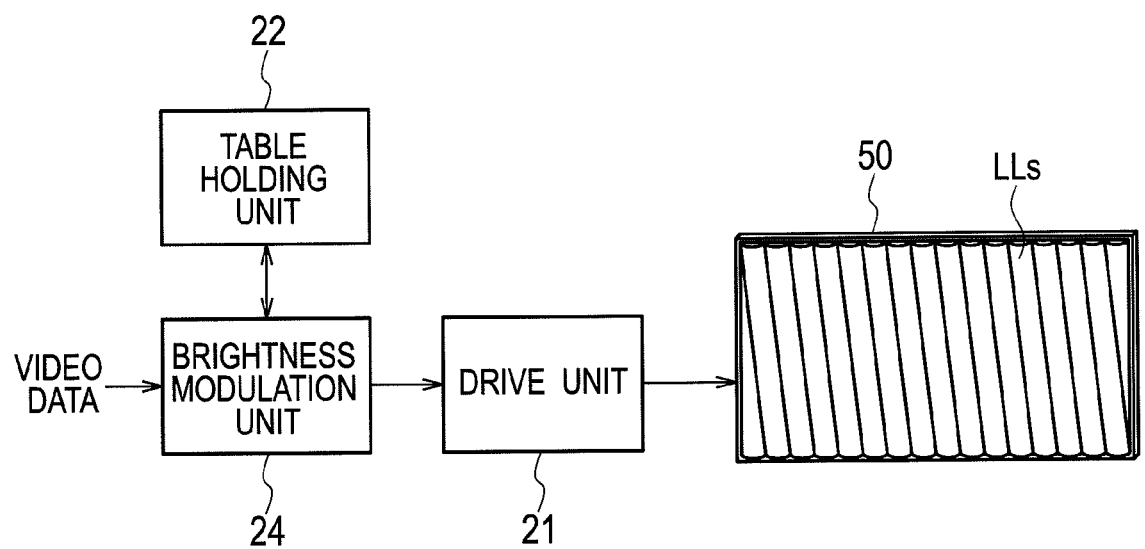
FIG. 13 is a block diagram showing a third configuration example in the naked-eye stereoscopic display apparatus of this embodiment.

A third configuration example shown in FIG. 13 is an example configured to modulate the brightness of the video data in advance and to supply the modulated video data to the drive unit. In FIG. 13, the same reference numerals are assigned to the same portions as in FIG. 8, and a description thereof is omitted as appropriate.

In FIG. 13, stereo content video data is inputted to a brightness modulation unit 24. In a table holding unit 22, an intensity modulation setting table similar to that in FIG. 7 is held. Based on the brightness modulation setting table held in the table holding unit 22, the brightness modulation unit 24 modulates the brightness of each pixel data of the inputted video data and supplies the image data concerned to a drive unit 21. The video data to be supplied to the drive unit 21 has already been subjected in advance to the brightness modulation with such characteristics as shown in FIG. 5.

The drive unit 21 drives the display device 50 to display the respective pixel data of the individual data portions which compose the image A and the image B in the inputted video data, while assigning the respective pixel data to the 17-viewpoint display device 50 as described with reference to FIG. 9. In this event, unlike the drive unit 1 in the first configuration example of FIG. 8, the drive unit 21 drives the display device 50 to display each pixel data at its input brightness. In the third configuration example, the brightness modulation unit 24 serves as the brightness control unit.

Fourth Configuration Example

Though not particularly illustrated, in the configuration including the number-of-viewpoints detection unit as in the second configuration example described with reference to FIG. 10, it is also possible to adopt a configuration so that the brightness of the video data can be modulated in advance and supplied to the drive unit in a similar way to the third configuration example.

Figure 14:
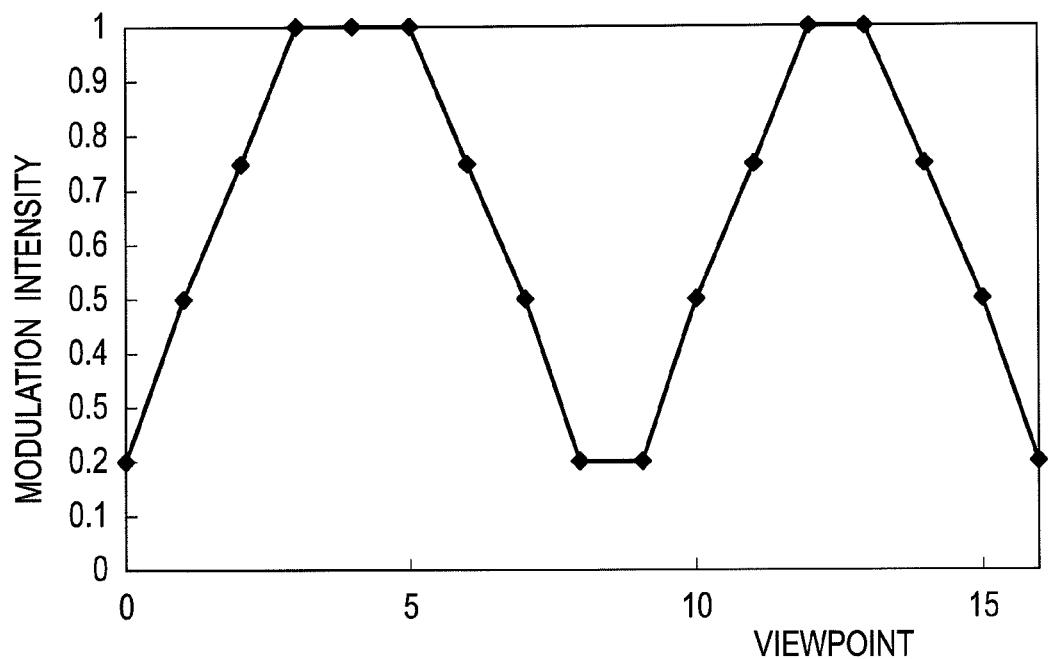
FIG. 14 is a characteristic chart showing a relationship between the viewpoint and modulation intensity of the image to be displayed in this embodiment.

FIG. 14 shows a relationship between the viewpoint and modulation intensity of the image to be displayed on the display device 50 in each of the above-described configuration examples. As shown by FIG. 14, brightness of pixel data is reduced (by one of the drive units 1 or 11 or the brightness modulation unit 24) for viewpoint images in the range k on each side of the image boundary in the horizontal direction. In the event that the observation point of the observer moves towards the boundary between images A and B, pixel brightness in the range k is reduced continuously. Moreover, in the event that the observation point of the observer moves away from the boundary between images A and B, pixel brightness in the range k increases smoothly until viewpoints from only a single image are viewed. In this event, as mentioned above, it is preferable that the characteristics of the pixel brightness variation are such that brightness is continuously reduced and increased using a function which produces an upward-facing convex-shaped curve. In this embodiment, stereo content video data is displayed using the characteristics shown in FIG. 14 on the display device 50. Accordingly, in the event of switching from the image A to the image B and switching from the image B to the image A, the brightness is gently increased, and the related viewpoint images are less likely to be recognized as noise. Additionally, the images are less likely to give the tired feeling, and accordingly, the deterioration of the resolution feeling can also be suppressed.

As described above, in accordance with this embodiment, in the event of displaying video data with less than N viewpoints on the naked-eye stereoscopic display apparatus that is capable of displaying naked-eye stereoscopic vision with N viewpoints (where N is an integer of three or more), by using an optical member in which the periodic direction of the optical elements is inclined with respect to the horizontal direction of the pixel array, it becomes possible to suppress the deterioration of the resolution feeling and the occurrence of noise.

The present invention is not limited to the embodiment described above, and is changeable in various ways within the scope without departing from the spirit of the present invention. In the embodiment, description is mainly made of the case of displaying two-viewpoint stereo contents on naked-eye stereoscopic display apparatus that is capable of naked-eye stereoscopic vision with N viewpoints; however, the present invention can be applied to the case of displaying video data with less than N viewpoints on naked-eye stereoscopic display apparatus with N viewpoints.

Moreover, in this embodiment, description is mainly made of the case of using a lenticular lens as the optical member; however, the optical member is not limited to a lenticular lens. However, a lenticular lens is preferable as the optical member.

What is claimed is:

1. A naked-eye stereoscopic display apparatus comprising:
a display device in which a plurality of pixels are arrayed in a horizontal direction and a vertical direction;
an optical member in which a plurality of optical elements are periodically arrayed and arranged on the display device in a state where the periodic direction of the optical elements is inclined with respect to the horizontal direction of the pixels in the display device and whereby, in the event of displaying first image data composed of N different viewpoint images where N is defined as an integer of three or more, the optical member is configured to divide the viewpoint images into each separate viewpoint direction and to present the divided viewpoint images on the display device, by assigning respective pieces of pixel data of the first image data to the plurality of pixels; and
a brightness control unit which, in a state where second video data composed of less than N different viewpoint images is displayed on the display device by assigning respective pieces of pixel data of the second video data to the plurality of pixels, and where an observer observes the display device from the optical member side, is configured to lower brightness of pixel data of viewpoint images which are seen to overlap each other.

2. The naked-eye stereoscopic display apparatus according to claim 1, wherein, when a number of the viewpoint images seen to overlap each other is defined to be 2 k while defining k as a natural number, the control unit lowers brightness of pixel data for viewpoint images in a range k on each side of an image boundary in the horizontal direction, in the event that an observation point of the observer moves towards the image boundary.

3. The naked-eye stereoscopic display apparatus according to claim 2, further comprising:
a holding unit configured to hold a table in which characteristics to lower the brightness of the pixel data of each viewpoint image are set, or to hold a function for calculating the lowered brightness of the pixel data of each viewpoint image,
wherein the brightness control unit lowers the brightness of the pixel data of each viewpoint image so that the brightness becomes equal to a brightness obtained by the table held in the holding unit or by the function held in the holding unit.

4. The naked-eye stereoscopic display apparatus according to claim 1, further comprising:
a drive unit configured to drive the display device to display the second video data thereon,
wherein the drive unit serves as the brightness control unit.

5. The naked-eye stereoscopic display apparatus according to claim 1, further comprising:
a drive unit configured to drive the display device to display the second video data thereon; and
a brightness modulation unit configured to lower in advance the brightness of the pixel data of the viewpoint images seen to overlap each other in the second video data and to supply the pixel data to the drive unit,
wherein the brightness modulation unit serves as the brightness control unit.

6. The naked-eye stereoscopic display apparatus according to claim 2,
wherein the brightness control unit continuously reduces the brightness of the pixel data of the viewpoint images in the range k in the horizontal direction when approaching the image boundary and continuously increases the brightness of the pixel data of the viewpoint images in the range k in the horizontal direction when moving away from the image boundary.

7. The naked-eye stereoscopic display apparatus according to claim 6,
wherein the brightness control unit continuously reduces, when approaching the boundary, the brightness of the pixel data of the viewpoint images in the range k in the horizontal direction using a non-linear function producing an upward-facing convex-shaped curve, and continuously increases, when moving away from the boundary, the brightness of the pixel data of the viewpoint images in the range k in the horizontal direction using a function producing an upward-facing convex-shaped curve.

8. The naked-eye stereoscopic display apparatus according to claim 1, further comprising:
a number-of-viewpoints detection unit configured to detect a number of the viewpoints of the second video data,
wherein, only in the case where the number of detected viewpoints detected by the number-of-viewpoints detection unit, is a specific number of viewpoints, the brightness control unit performs the control to lower the brightness of the pixel data of the view point images seen to overlap each other.

9. The naked-eye stereoscopic display apparatus according to claim 1,
wherein the optical member is a lenticular lens.

* * * * *